US012642412B2

(12) United States Patent　　　　(10) Patent No.:　US 12,642,412 B2
Lin　　　　　　　　　　　　　　　　 (45) Date of Patent:　　　Jun. 2, 2026

(54) CONTROL METHOD FOR CLEANING DEVICE AND CLEANING DEVICE

(71) Applicant: ROBOTIN (SHENZHEN) CO., LTD., Shenzhen (CN)

(72) Inventor: Zhouxiong Lin, Shenzhen (CN)

(73) Assignee: ROBOTIN (SHENZHEN) CO., LTD., Shenzhen (CN)

( * ) Notice: Subject to any disclaimer, the term of this patent is extended or adjusted under 35 U.S.C. 154(b) by 261 days.

(21) Appl. No.: 18/526,448

(22) Filed: Dec. 1, 2023

(65) Prior Publication Data

US 2025/0057379 A1　　　Feb. 20, 2025

(30) Foreign Application Priority Data

Aug. 17, 2023　 (CN) ......................... 202311044410.1

(51) Int. Cl.
　*A47L 11/40*　　　(2006.01)
　*G06T 7/00*　　　(2017.01)
　*G06T 7/73*　　　(2017.01)
(52) U.S. Cl.
　CPC ......... *A47L 11/4011* (2013.01); *G06T 7/0002* (2013.01); *G06T 7/74* (2017.01); *A47L 2201/06* (2013.01)
(58) Field of Classification Search
　CPC ............. A47L 11/4011; A47L 2201/06; A47L 9/2805; A47L 9/2852; A47L 11/24; A47L 11/4002; A47L 2201/00; G06T 7/0002; G06T 7/74
　See application file for complete search history.

(56) References Cited

U.S. PATENT DOCUMENTS

| | | | | |
|---|---|---|---|---|
| 9,358,690 B2 * | 6/2016 | Sawada | ................. | G05D 1/0272 |
| 10,073,044 B2 * | 9/2018 | Heske, III | ............ | G01N 21/958 |
| 10,390,674 B2 * | 8/2019 | Walz | ...................... | A47L 11/282 |
| 2005/0192707 A1 * | 9/2005 | Park | ........................ | A47L 9/281 |
| | | | | 700/259 |
| 2007/0195185 A1 * | 8/2007 | Onuki | .................. | H04N 23/634 |
| | | | | 348/333.02 |

(Continued)

FOREIGN PATENT DOCUMENTS

| | | |
|---|---|---|
| CN | 106163360 A | 11/2016 |
| CN | 106821155 A | 6/2017 |

(Continued)

OTHER PUBLICATIONS

International Search Report and Written Opinion issued in corresponding PCT Application No. PCT/CN2024/071632, dated Mar. 25, 2024.

*Primary Examiner* — Aaron W Carter

(74) *Attorney, Agent, or Firm* — Westbridge IP LLC

(57)　　　　　　ABSTRACT

Disclosed are a control method for a cleaning device and the cleaning device. The cleaning device includes a cleaning component, a processor, a memory and at least one camera. The control method includes: obtaining, via a processor, a contrast image of a position to be cleaned, and storing the contrast image in the memory; capturing, via a camera, an image of the position to be cleaned as a first image; comparing, via the processor, the first image with the contrast image to obtain a dirt mark; and controlling, via the processor, the cleaning component to clean dirt at the dirt mark.

11 Claims, 8 Drawing Sheets

(56) References Cited

U.S. PATENT DOCUMENTS

| | | | | |
|---|---|---|---|---|
| 2013/0331990 A1* | 12/2013 | Jeong | ................... | G05D 1/0238 |
| | | | | 348/118 |
| 2016/0236352 A1* | 8/2016 | Sawada | ................... | G05D 1/00 |
| 2017/0007091 A1* | 1/2017 | Walz | ................... | A47L 11/302 |
| 2017/0090456 A1* | 3/2017 | Mao | ................... | G05D 1/0246 |
| 2017/0332871 A1* | 11/2017 | Sung | ................... | G01S 17/46 |
| 2018/0263449 A1* | 9/2018 | Rosskopf | ................... | A47L 9/2852 |
| 2019/0049979 A1* | 2/2019 | Brede | ................... | G05D 1/0219 |
| 2019/0164271 A1* | 5/2019 | Herchenbach | ................... | G06T 7/0002 |
| 2020/0249690 A1* | 8/2020 | Regev | ................... | G05D 1/0246 |
| 2021/0375235 A1* | 12/2021 | Zheng | ................... | G09G 5/10 |
| 2022/0133112 A1* | 5/2022 | Windorfer | ................... | A47L 9/2894 |
| | | | | 15/319 |
| 2023/0199287 A1* | 6/2023 | Basso | ................... | G01J 5/026 |
| | | | | 348/746 |
| 2024/0230862 A1* | 7/2024 | Yin | ................... | H04N 23/811 |
| 2025/0057379 A1* | 2/2025 | Lin | ................... | A47L 9/2852 |
| 2025/0137808 A1* | 5/2025 | Choi | ................... | G01C 21/3811 |
| 2025/0196195 A1* | 6/2025 | Corens | ................... | B08B 3/10 |
| 2025/0221596 A1* | 7/2025 | Kumar | ................... | A47L 11/4011 |

FOREIGN PATENT DOCUMENTS

| | | | |
|---|---|---|---|
| CN | 108289584 A | 7/2018 | |
| CN | 108416271 A | 8/2018 | |
| CN | 109381122 A | 2/2019 | |
| CN | 110025268 A | 7/2019 | |
| EP | 2387931 A2 | 11/2011 | |
| WO | WO-2024022223 A1 * | 2/2024 | .......... A47L 11/4061 |

* cited by examiner

S141 the camera captures an image of the position to be cleaned after being cleaned as a fourth image

S142 the processor compares the fourth images obtained from two adjacent times in time sequence, and uses the fourth image with fewer image features as the third image

S150 the processor uses the third image as a contrast image and stores it in the memory

CONTROL METHOD FOR CLEANING DEVICE AND CLEANING DEVICE

CROSS-REFERENCE TO RELATED APPLICATIONS

The present application claims priority to Chinese Patent Application No. 202311044410.1, filed on Aug. 17, 2023, entitled "CONTROL METHOD FOR CLEANING DEVICE AND CLEANING DEVICE", the entire contents of which are incorporated herein by reference.

TECHNICAL FIELD

The present application relates to the technical field of cleaning machines, and in particular to a control method for a cleaning device and the cleaning device.

BACKGROUND

At present, sweeping robots mainly use big data training to identify dirt in images, and then perform subsequent dirt treatment. The matching degree of this method of identifying dirt depends on the effect of big data learning and training. Since it is difficult to collect multiple data such as real waste, grime and dirt and higher costs is required, and once the training of big data is not comprehensive enough, it will be difficult for the sweeping robot to accurately determine whether there is dirt in the image, which can easily lead to misidentification.

SUMMARY

The main purpose of the present application is to provide a control method for a cleaning device. The technical solution of the present application aims to identify waste such as dirt by comparing the pre cleaning images captured through a camera at the same position to be cleaned with the previous post-cleaning images, thereby controlling the cleaning device to clean dirt, and ensuring the accuracy of the cleaning device in identifying dirt.

In order to achieve the above objective, an embodiment of the present application provides a control method for a cleaning device. The control method includes:

obtaining, via a processor, a contrast image of a position to be cleaned and storing the contrast image in a memory;

capturing, via a camera, an image of the position to be cleaned, as a first image;

comparing, via the processor, the first image with the contrast image to obtain a dirt mark; and controlling, via the processor, a cleaning component to clean dirt at the dirt mark.

In an embodiment, the obtaining, via the processor, the contrast image of the position to be cleaned and storing the contrast image in the memory includes:

capturing, via the camera, an image of the position to be cleaned after being cleaned, as a second image;

comparing, via the processor, multiple second images obtained within a period of time, retaining image features common to the multiple second images, and obtaining the contrast image; and storing, via the memory, the contrast image.

In an embodiment, the obtaining, via the processor, the contrast image of the position to be cleaned and storing the contrast image in the memory includes:

capturing, via the camera, an image of the position to be cleaned that has been thoroughly cleaned, as a third image; and configuring, via the processor, the third image as the contrast image and storing the contrast image in the memory.

In an embodiment, the capturing, via the camera, the image of the position to be cleaned that has been thoroughly cleaned, as the third image includes:

capturing, via the camera, an image of the position to be cleaned after being cleaned, as a fourth image; and comparing, via the processor, the fourth images obtained from two adjacent times according to time sequence, and configuring the fourth image with fewer image features as the third image.

In an embodiment, the control method for the cleaning device further includes:

obtaining, via the cleaning device, a preset image, and the preset image is the first image or the contrast image.

The obtaining, via the cleaning device, the preset image includes:

moving the cleaning device along a predetermined route;

capturing, via the camera, multiple images at different positions on the predetermined route according to a preset interval, as a fifth image; and sorting, via the processor, the multiple fifth images to obtain the preset image.

In an embodiment, the sorting, via the processor, the multiple fifth images to obtain the preset image includes:

identifying, via the processor, a same part of two adjacent fifth images, as a positioning identifier;

adjusting, via the processor, a relative position of the positioning identifiers of two adjacent fifth images, to allow the same part of the two adjacent fifth images to overlap; and removing, via the processor, one of the same part in the two adjacent fifth images, to obtain the preset image.

In an embodiment, after controlling, via the processor, the cleaning component to clean dirt at the dirt mark, the method further includes:

capturing, via the camera, an image of the position to be cleaned after being cleaned by the cleaning component, as a sixth image;

comparing, via the processor, the sixth image with the first image to determine whether the dirt mark changes;

in response to that the dirt mark changes, repeatedly cleaning, via the cleaning component, the dirt at the dirt mark until the dirt is removed; and in response to that the dirt mark does not change, determining, via the processor, that the dirt at the dirt mark cannot be cleaned, and updating the contrast image according to the dirt mark.

In an embodiment, before or at the same time as the capturing, via the camera, the image of the position to be cleaned as the first image, the method further includes:

emitting, via a laser scanner, a scanning laser to the position to be cleaned, so that the processor obtains three-dimensional information of an object at the position to be cleaned as a height parameter; and recording, via the processor, the height parameter in the first image so that an image feature corresponding to the first image has the height parameter.

In an embodiment, before the controlling, via the processor, the cleaning component to clean dirt at the dirt mark, the method further includes:

determining, via the processor, whether a height of the dirt at the dirt mark is within a preset height according to the height parameter;

in response to that the height of the dirt at the dirt mark is within the preset height, controlling, via the processor, the cleaning component to clean the dirt at the dirt mark; and in response to that the height of the dirt at the dirt mark is not within the preset height, determining, via the processor, that the dirt at the dirt mark cannot be cleaned, and updating the contrast image according to the dirt mark.

In an embodiment, the control method for the cleaning device further includes:

displaying, via the cleaning device, a preset image to a user terminal, and the preset image is the first image or the contrast image.

The displaying, via the cleaning device, the preset image to the user terminal includes:

emitting, via a laser scanner, a scanning laser to the position to be cleaned, so that the processor obtains a height parameter of an object at the position to be cleaned;

recording, via the processor, the height parameter in the preset image and sending a preset image signal to the user terminal; and receiving, via the user terminal, the preset image signal to display the preset image; and the preset image is configured to record at least one of the height parameter, a color parameter and a grayscale parameter.

The present application also proposes a cleaning device, the cleaning device includes a cleaning component, a processor, a memory and at least one camera, a control program executable on the processor is stored in the memory, and the steps of the control method as described above are implemented when the control program is executed by the processor.

The present application also proposes a computer-readable storage medium, a control program is stored on the computer-readable storage medium, and the steps of the control method as described above are implemented when the control program is executed by a processor.

In the technical solution of the present application, when the cleaning device is in the cleaning mode, the cleaning device will clean the position to be cleaned along the preset path. During the cleaning process of the cleaning device, the camera obtains the first image, and uses the processor to analyze and compare the difference between the first image and the contrast image stored in the memory, the processor obtains the difference between the two images and defines the difference as a dirt mark. Then, the processor issues a cleaning instruction to the cleaning component, and the cleaning component cleans the position defined as the dirt mark on the position to be cleaned. In this way, the cleaning device can directly identify the dirt without performing big data training in advance, reducing the pre-training cost, thereby completing the cleaning of the dirt. At the same time, by comparing the difference between the first image and the contrast image, the dirt on the position to be cleaned can be cleaned in real time and accurately, avoiding missed cleaning or mistaken cleaning.

BRIEF DESCRIPTION OF THE DRAWINGS

In order to describe the technical solutions in the embodiments of the present application or in the related art more clearly, the accompanying drawings required to be used in the description of the embodiments or the related art will be briefly introduced below. Obviously, the accompanying drawings in the following description are only some embodiments of the present application. For those skilled in the art, other drawings can be obtained based on the structures shown in these drawings without creative efforts.

The realization of the purpose, functional features and advantages of the present application will be further described in conjunction with the embodiments, with reference to the accompanying drawings.

DETAILED DESCRIPTION OF THE EMBODIMENTS

It should be understood that the specific embodiments described here are only used to explain the present application and are not intended to limit the present application.

Figure 1:
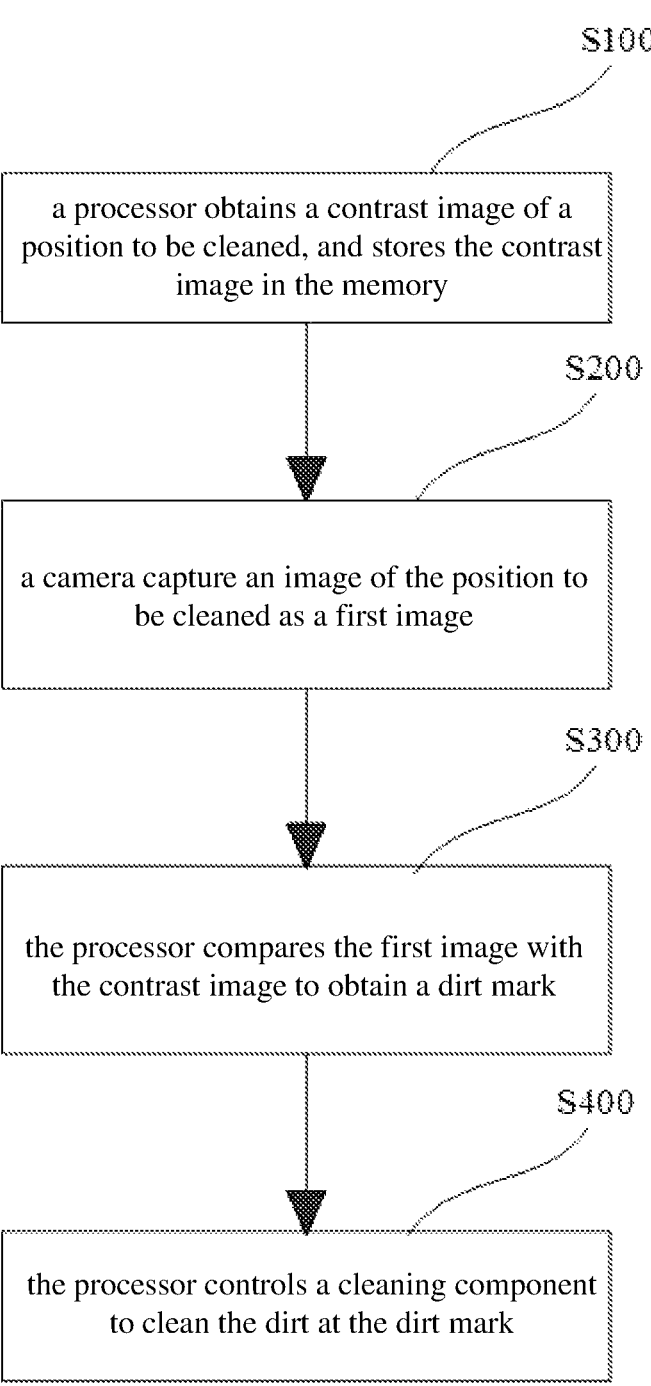
FIG. 1 is a flow chart of a control method for a cleaning device according to an embodiment of the present application.

The present application provides a control method for a cleaning device. In a first embodiment of the control method, referring to FIG. 1, the control method for the cleaning device includes:

S100, a processor 100 obtains a contrast image of a position to be cleaned, and stores the contrast image in the memory 300;

S200, a camera 400 captures an image of the position to be cleaned as a first image;

S300, the processor 100 compares the first image with the contrast image to obtain a dirt mark; and S400, the processor 100 controls a cleaning component 200 to clean the dirt at the dirt mark.

It should be noted that in this embodiment, the memory 300 first stores the contrast image for comparison. The contrast image can be the first image obtained from the initial cleaning of the position to be cleaned by the cleaning device, or can be the image formed by repeatedly cleaning the position to be cleaned by the cleaning device and continuously stacking and updating during subsequent use, which can represent the relatively clean state of the position to be cleaned.

In the technical solution of the present application, when the cleaning device is in a cleaning mode, the cleaning device will clean the position to be cleaned along a preset path. During the cleaning process of the cleaning device, the camera 400 obtains the first image and uses the processor 100 to analyze and compare the difference between the first image and the contrast image stored in the memory 300. The processor 100 obtains the difference between the two images and defines the difference as a dirty mark. Then, the processor 100 issues a cleaning command to the cleaning component 200, and the cleaning component 200 cleans the position defined as the dirty mark on the position to be cleaned. In this way, the cleaning device can directly distinguish the dirt without performing big data training in advance, which reduces the pre-training cost and completes the cleaning of the dirt. Meanwhile, by comparing the difference between the first image and the contrast image, the dirt on the position to be cleaned can be cleaned in real time and accurately to avoid missed cleaning or mistaken cleaning.

The position to be cleaned can be the ground, but is not limited to floor tiles, wooden floors or carpets. The camera 400 focuses on the position to be cleaned so that the first image is clearer, so that the processor 100 compares the contrast image with the first image, which can easily distinguish the difference between the two images to improve the accuracy of the dirt mark.

Specifically, the first image can be the image before cleaning the position to be cleaned along a certain section of the preset path by the cleaning device. At this time, the processor 100 can control the cleaning component 200 to clean the dirt mark multiple times based on the dirty degree of the dirty mark compared between the first image and the contrast image. The determination of the dirty degree of the dirty mark depends on the difference in color and grayscale; or the camera 400 acquires an image of the position to be cleaned again after the position to be cleaned is cleaned. The processor 100 compares the image with the first image or the contrast image to determine whether the dirty mark has changed, thereby determining whether the dirty mark needs to be repeatedly cleaned. Of course, the first image can also be an image after the initial cleaning of the position to be cleaned along a certain section of the preset path. In this case, the processor 100 can compare the first image and the contrast image to find out the presence of the dirty mark, and then clean the dirty mark. After completing the cleaning of the dirty mark, the camera 400 obtains an image of the dirty mark again. The processor 100 compares the image with the first image or the contrast image to determine whether the dirty mark has changed, thereby determining whether the dirty mark needs to be cleaned repeatedly. If both of the above situations require repeated cleaning of the dirty mark, after the camera 400 obtains an image that the dirty mark has been cleaned to a certain level, the processor 100 determines that the dirty degree of the dirty mark has been lower than a certain threshold, then the cleaning component 200 is controlled to stop cleaning the dirty mark, and the cleaning device is controlled to go to the next section of the preset path for cleaning.

Figure 2:
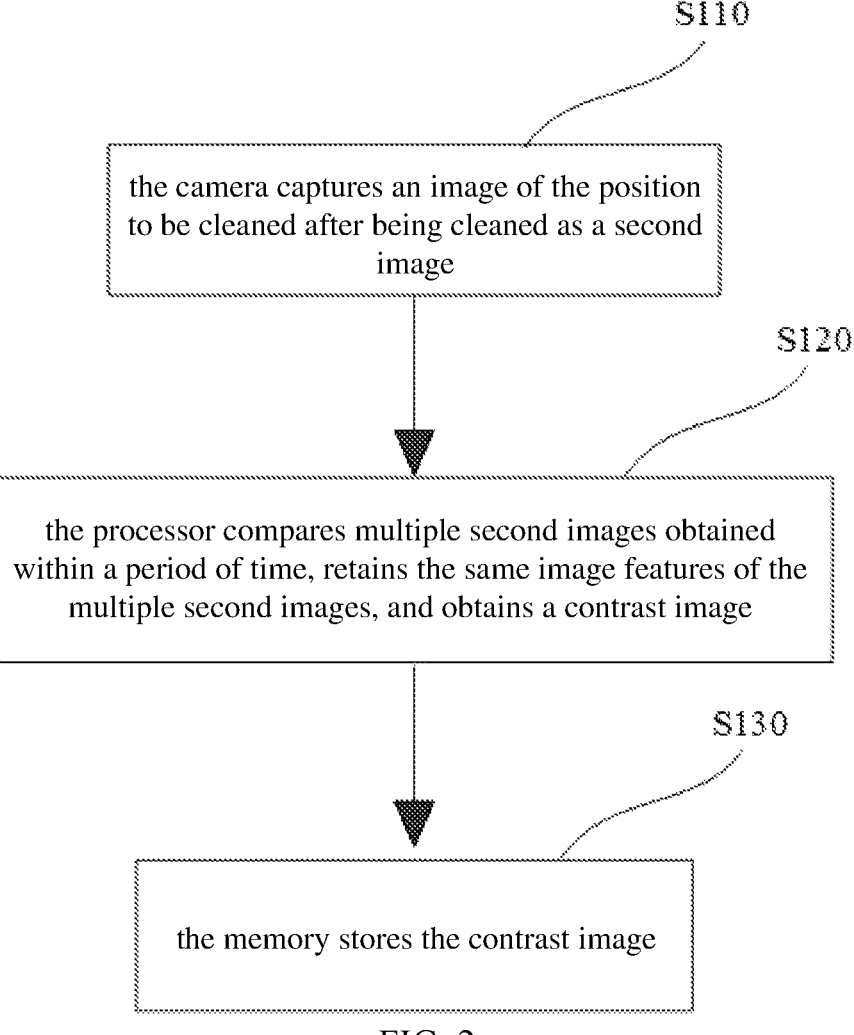
FIG. 2 is a flow chart of the control method for the cleaning device according to another embodiment of the present application.

In an embodiment, as shown in FIG. 2, step S100 specifically includes:

S110, the camera 400 captures an image of the position to be cleaned after being cleaned as a second image;

S120, the processor 100 compares multiple second images obtained within a period of time, retains the same image features of the multiple second images, and obtains a contrast image; and

S130, the memory 300 stores the contrast image.

After each cleaning of the position to be cleaned by the cleaning device, the camera 400 obtains a second image of the position to be cleaned after being cleaned. When the cleaning device completes the preset cleaning times, the processor 100 compares and analyzes multiple stored second images, extracts image features common to the multiple second images, and splices or overlaps these same image features to form a contrast image. Here, it should be noted that during the process of completing the preset cleaning times by the cleaning device, the contrast image used by the cleaning device can be the image after the cleaning device cleans the position to be cleaned for the first time, or can be the image obtained after the previous cleaning in two adjacent cleaning process, or before the preset times of cleaning completed by the cleaning device, the cleaning device performs simple cleaning according to the predetermined cleaning path, without controlling the cleaning device to clean the dirt through image comparison, and obtains the second image after each cleaning is completed. The preset number of times can be 100 times, 50 times, or 150 times, etc. It should be noted that for the same position to be cleaned, according to the time sequence, the same features of multiple images recorded after cleaning should belong to the clean part of the position to be cleaned or the part that cannot be cleaned by the cleaning device. In this way, the obtained contrast image can more accurately reflect the image information in the relatively clean state of the position to be cleaned.

Figure 3:
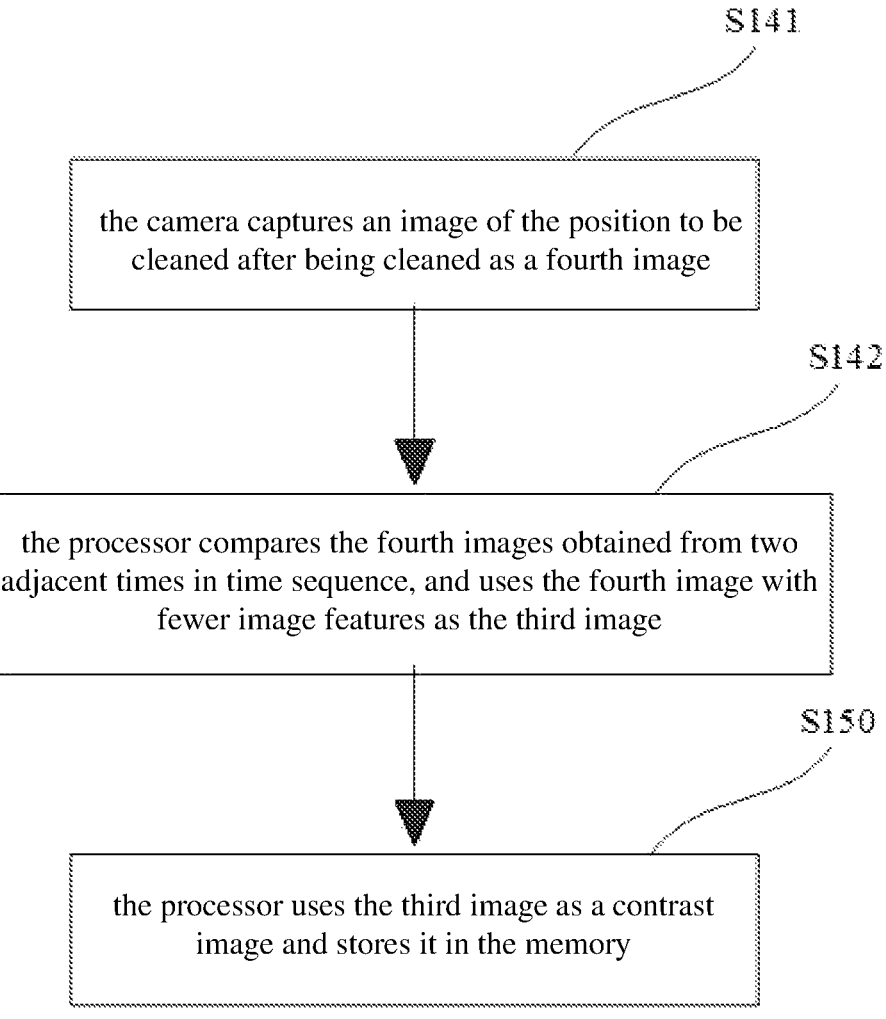
FIG. 3 is a flow chart of the control method for the cleaning device according to another embodiment of the present application.

In another embodiment, as shown in FIG. 3, step S100 specifically includes:

S140, the camera 400 captures an image of the position to be cleaned that has been thoroughly cleaned as a third image; and

S150, the processor 100 uses the third image as a contrast image and stores it in the memory 300.

It should be noted that the third image can represent the relatively clean state of the position to be cleaned before this cleaning. In this way, before each cleaning, the processor 100 compares the first image with the image in the relatively clean state of the position to be cleaned, which can accurately determine the dirty position of the position to be cleaned before cleaning, so that the processor 100 can more accurately determine the dirt mark, and the cleaning device can better ensure the cleanliness of the position to be cleaned.

Further, in this embodiment, please continuing to refer to FIG. 3, step S140 specifically includes:

S141, the camera 400 captures an image of the position to be cleaned after being cleaned as a fourth image; and

S142, the processor 100 compares the fourth images obtained from two adjacent times in time sequence, and uses the fourth image with fewer image features as the third image.

After each cleaning of the position to be cleaned by the cleaning device, the camera 400 obtains the fourth image of the position to be cleaned after being cleaned. During the use of the cleaning device, the fourth images obtained after previous cleanings are stored in the memory 300, and after each fourth image is obtained, the processor 100 compares the newly obtained fourth image with the fourth image obtained after the previous cleaning stored in the memory 300, and uses the fourth image with fewer image features as a representative of the relatively clean state of the position to be cleaned. In this way, the obtained contrast image can reflect the image information in the relatively clean state of the position to be cleaned in a timely and accurate manner. It should be noted that during the interval between two adjacent cleanings, objects placed at the position to be cleaned change slightly, so that the fourth image with fewer image features among the fourth images at the two times will be the image in the state in which the position to be cleaned is more thoroughly cleaned, avoiding the situation where the cleaning device misses the cleaning. Of course, in other embodiments, the processor 100 can compare the currently obtained fourth image with all the fourth images stored in the memory 300 to use the fourth image with fewer image features as the third image. It should be noted that the camera 400 mainly acquires image information of the ground. The number of image features referred to in this embodiment is based on the floor surface in the image, and the number of objects on the floor surface is the number of image features.

Figure 4:
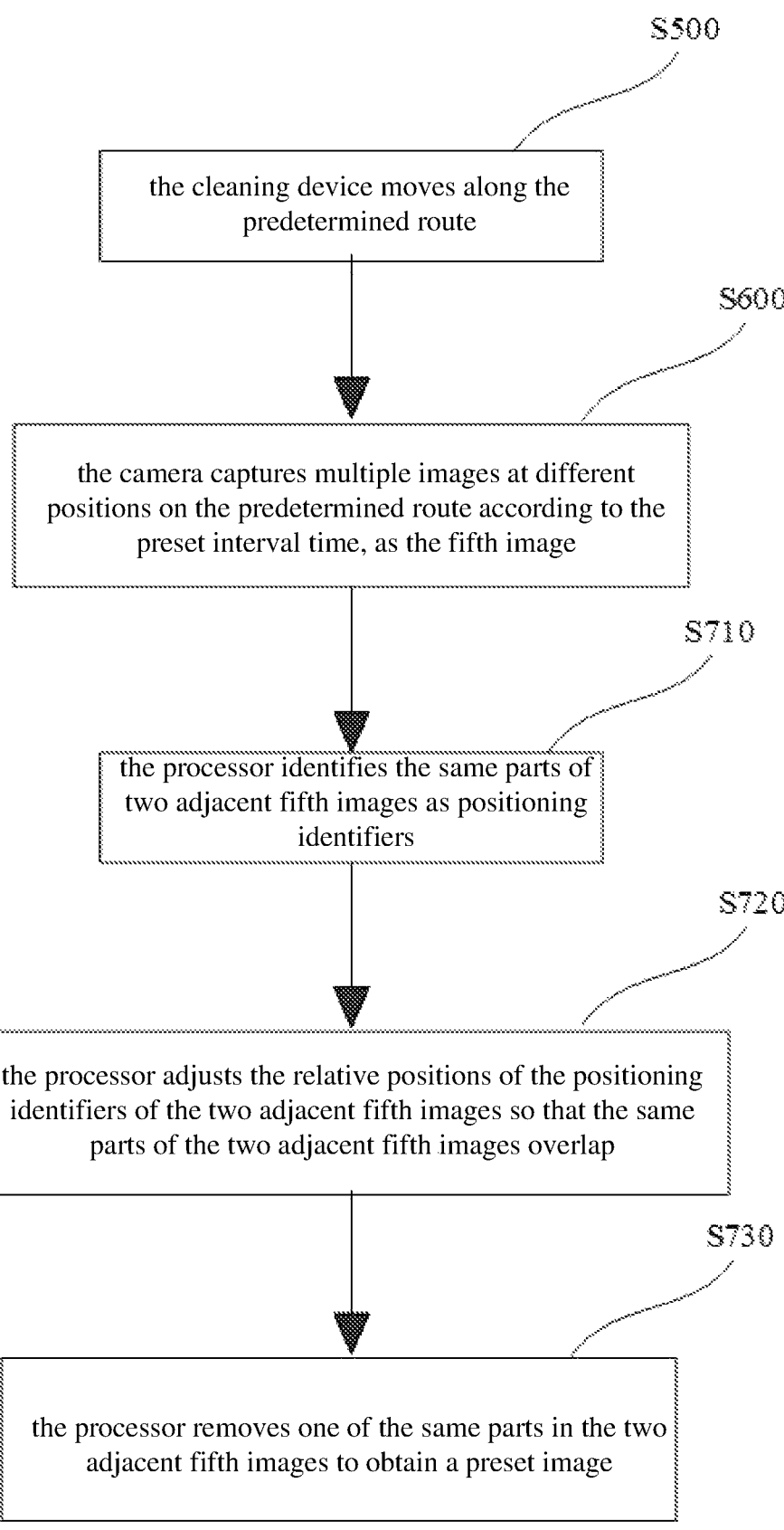
FIG. 4 is a flow chart of the control method for the cleaning device according to another embodiment of the present application.

In yet another embodiment, as shown in FIG. 4, the control method for the cleaning device further includes the step of obtaining a preset image by the cleaning device, and the preset image is the first image or the contrast image; the step of obtaining the preset image by the cleaning device specifically includes:

S500, the cleaning device moves along the predetermined route;

S600, the camera 400 captures multiple images at different positions on the predetermined route according to the preset interval time, as the fifth image; and S700, the processor 100 sorts multiple fifth images to obtain a preset image.

It should be noted that the position to be cleaned can be an indoor or outdoor environment such as a room, a living room, a lobby, a terrace, or a combination thereof. Since the camera 400 shoots toward the ground, the range of images captured by the camera 400 in a single shot is relatively small, while the area of the position to be cleaned is relatively large. Considering that if the single shooting area of the camera 400 is increased, the captured image can be easily deformed relative to the position to be cleaned, thus affecting the determination of the processor 100. In this way, the plurality of fifth images of different floors at the position to be cleaned captured by the camera 400 are processed by the processor 100 to splice a first image that can completely record the position to be cleaned, thereby ensuring the clarity of the image features recorded in the first image. Of course, in other embodiments, the cleaning device can use a camera 400 with higher pixels, and use the camera 400 to directly and clearly cover all the ground features of the position to be cleaned to form the first image.

The preset interval time is based on the walking speed of the cleaning device, the frame of the fifth image obtained by the camera 400 each time and the shooting speed of the camera 400, so as to reduce the number of duplicate image information in the two adjacent fifth images as much as possible. Specifically, the cleaning device has relatively accurate positioning capabilities, such as using light reflection or image information reference to obtain positioning information, so that the cleaning device can move stably along the preset route. Through accurate positioning, the processor 100 can associate the fifth image with the coordinates of the cleaning device, so that when the fifth images at different positions are combined, a complete first image reflecting the position to be cleaned can be spliced. It can be understood that the first image and the contrast image are spliced in the above manner to ensure the clarity of the contrast image and the first image and facilitate the determination of the processor 100. Alternatively, in this technical solution, any image obtained by the cleaning device through the camera 400 that needs to fully cover the position to be cleaned can be mapped by referring to the ideas from step S500 to step S700 described above.

Further, in this embodiment, as shown in FIG. 4, step S700 specifically includes:

S710, the processor 100 identifies the same parts of two adjacent fifth images as positioning identifiers;

S720, the processor 100 adjusts the relative positions of the positioning identifiers of the two adjacent fifth images so that the same parts of the two adjacent fifth images overlap;

S730, the processor 100 removes one of the same parts in the two adjacent fifth images to obtain a preset image.

It should be noted that due to the slow movement of the cleaning device and the fast shooting speed of the camera 400, during the actual movement, the error in the moving speed will inevitably cause overlapping parts between adjacent fifth images. Considering that there may be a certain deviation in the positioning of the cleaning device. In this way, the processor 100 first identifies the same parts of two adjacent fifth images to determine the positioning identifier, and then overlaps the same part of the adjacent fifth images by using the positioning identifiers of the two adjacent fifth images as a reference. Then, the processor removes the redundant overlapping parts and splices the plurality of fifth images into the first image. In this way, the positioning identifier can provide a reference for the processor 100 to splice, which can reduce the computational load of the processor 100. In addition, considering that image splicing does not require complete recognition of the fifth image, when the processor 100 identifies the same part of two adjacent fifth images, it is possible to adjust the position of the two adjacent fifth images and overlap and splice the two fifth images, with the positioning identifier as a reference.

Figure 5:
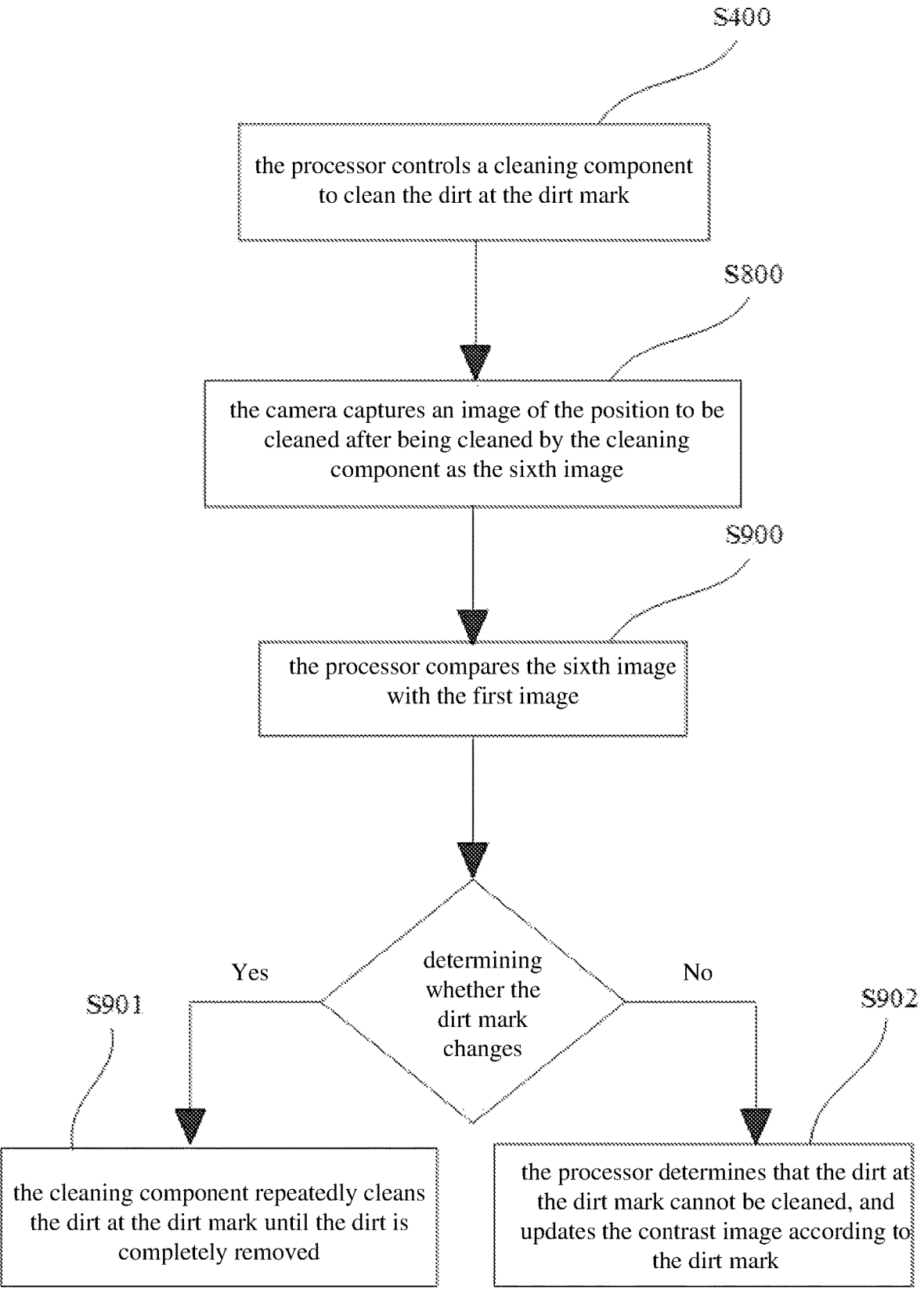
FIG. 5 is a flow chart of the control method for the cleaning device according to another embodiment of the present application.

In yet another embodiment, please referring to FIG. 5, after step S400, the method also includes:

S800, the camera 400 captures an image of the position to be cleaned after being cleaned by the cleaning component 200 as the sixth image;

S900, the processor 100 compares the sixth image with the first image to determine whether the dirt mark changes;

in response to that the dirt mark changes, performing step S901, and the cleaning component 200 repeatedly cleans the dirt at the dirt mark until the dirt is completely removed;

in response to that the dirt mark does not change, performing step S902, and the processor 100 determines that the dirt at the dirt mark cannot be cleaned, and updates the contrast image according to the dirt mark.

It can be understood that the first image will be stored in the memory 300 after compared with the contrast image. After the cleaning component 200 cleans the dirt mark, the processor 100 will compare the sixth image acquired by the camera 400 with the first image just stored in the memory 300. If the comparison analysis shows that the dirt mark has changed, the processor 100 determines that the dirt at the dirt mark can be cleaned by the cleaning component 200, thereby controlling the cleaning component 200 to repeatedly clean the dirt at the dirt mark. If the comparison analysis shows that the dirt mark has not changed, the processor 100 determines that the cleaning component 200 cannot clean the dirt at the dirt mark, and changes the dirt mark to a normal image feature and records it in the contrast image to avoid repeated cleaning of the uncleanable position in the subsequent cleaning process. In this way, the cleaning device can better determine the dirt at the dirt mark and avoid missing or mistaken cleaning. Here, it should be noted that before the camera 400 obtains the sixth image, the cleaning component 200 can obtain the sixth image after cleaning the dirt at the dirt mark for the first time, or can obtain the sixth image after repeatedly clean the dirt at the dirt mark multiple times.

In addition, after the processor 100 determines that the dirt at the dirt mark can be cleaned by the cleaning component 200, and the cleaning component 200 repeatedly cleans for a predetermined number of times, the camera 400 will acquire the image of the dirt mark again and compare it with the sixth image and the first image to determine whether the dirt at the dirt mark has been thoroughly cleaned. If the dirt degree of the dirt mark is lower than the preset threshold, the processor 100 will determine that the dirt mark has been cleaned. If the dirt degree of the dirt mark is still higher than the preset threshold, the processor 100 controls the cleaning component 200 to continuously clean the dirt at the dirt mark until the dirt degree of the dirt mark is lower than the preset threshold. It should be noted that when the processor 100 determines the image features in the image, the color and grayscale of the image features can be used as a reference for the processor 100 to determine changes in the image features.

Figure 6:
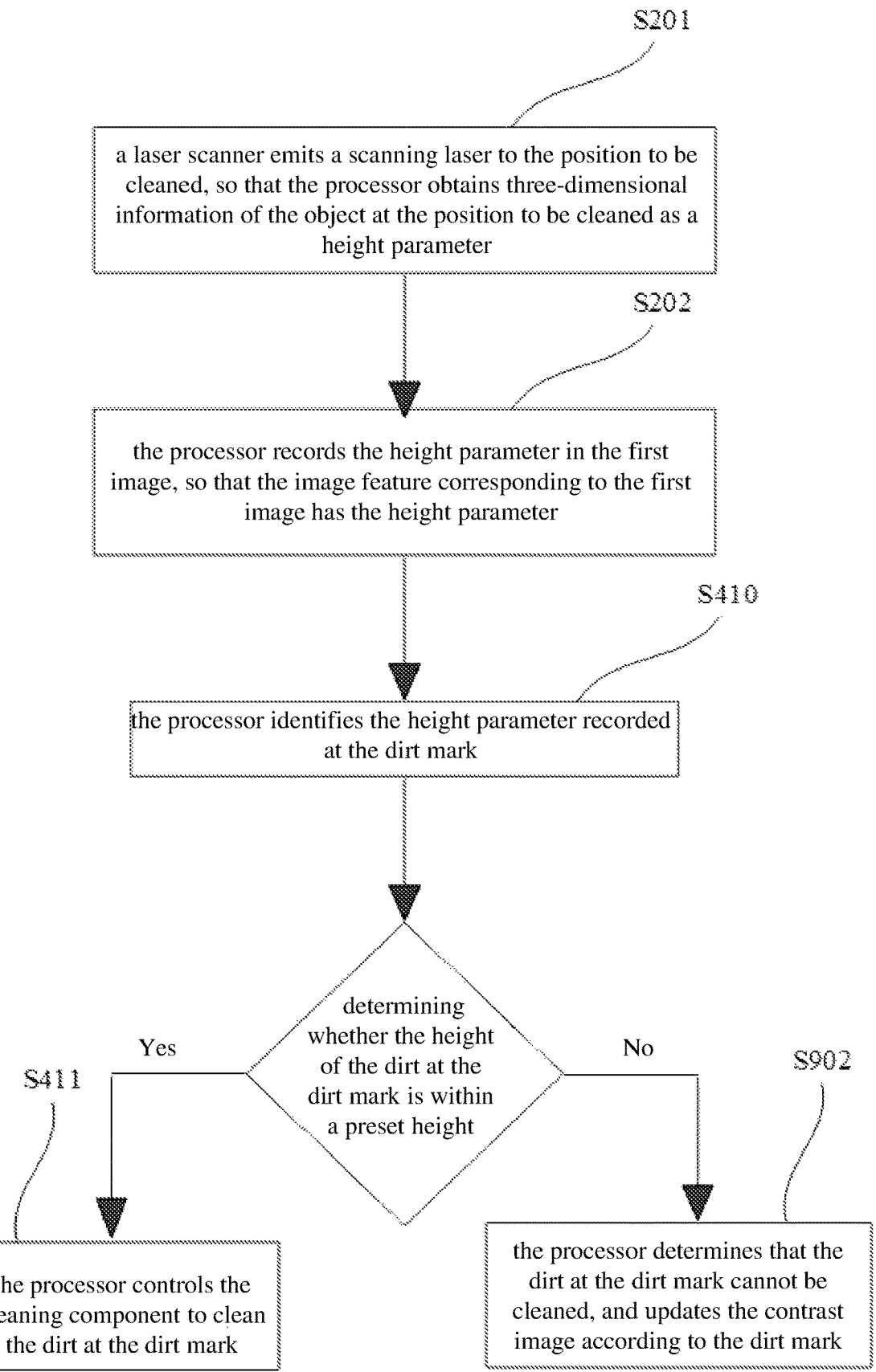
FIG. 6 is a flow chart of the control method for the cleaning device according to another embodiment of the present application.

In yet another embodiment, please referring to FIG. 6, before or at the same time as step S200, the method also includes:

S201, a laser scanner 500 emits a scanning laser to the position to be cleaned, so that the processor 100 obtains three-dimensional information of the object at the position to be cleaned as a height parameter; and S202, the processor 100 records the height parameter in the first image, so that the image feature corresponding to the first image has the height parameter.

Specifically, the scanning laser emitted by the laser scanner 500 is in a straight line and perpendicular to the emission direction of the laser scanner 500. The processor 100 analyzes the angle and time of the emitted light and the reflected light after reflection at the position to be cleaned, to obtain the distance between the part that can reflect light at the position to be cleaned and the current cleaning device, and convert and calculate the height of the part. In this embodiment, the laser scanner 500 is set as a ranging sensor for obtaining height information, such as a line laser sensor, an area array laser sensor or a time of flight (TOF) sensor. Specifically, if there is a table leg in front of the camera 400, the scanning laser will be blocked by the table leg. The processor 100 first analyzes the distance from the position of the reflected light on the table leg to the cleaning device, and calculates the height of the table leg on the ground based on the angle between the emitted light and the reflected light and the ground as well as time difference, so that the image feature of the first image can have the height parameter, which is convenient for subsequent determination and analysis by the processor or transmission to user terminals for viewing.

Please continuing to refer to FIG. 6. Before step S400, the method also includes:

S410, the processor 100 determines whether the height of the dirt at the dirt mark is within a preset height according to the height parameter;

in response to that the height of the dirt at the dirt mark is within a preset height, performing step S411, and the processor 100 controls the cleaning component 200 to clean the dirt at the dirt mark; and in response to that the height of the dirt at the dirt mark is not within the preset height, performing step S902, and the processor 100 determines that the dirt at the dirt mark cannot be cleaned, and updates the contrast image according to the dirt mark.

Without loss of generality, the preset height matches the processing capability of the processor 100 and the cleaning capability of the cleaning device. In this embodiment, the preset height is set to 1 cm, 2 cm or 1.5 cm, etc. In this way, the processor 100 can identify the dirt mark in a certain image feature of the first image, and associate the height parameter of the image feature with the dirt mark to obtain the height of the dirt at the dirt mark. Then, the processor 100 will determine whether the height of the dirt at the dirt mark is within the preset height. If the processor 100 compares and analyzes that the height of the dirt at the dirt mark is within the preset height, the dirt at the dirt mark can be cleaned by the cleaning component 200, and the processor 100 controls the cleaning component 200 to clean the dirt at the dirt mark. If the processor 100 compares and analyzes that the height of the dirt at the dirty mark exceeds the preset height, the processor 100 determines that the dirt mark cannot be cleaned, and defines the dirt mark as a common image feature and records it in the contrast image to avoid repeated cleaning of the uncleanable position in the subsequent cleaning process. At the same time, it also avoids damage to the cleaning device caused by cleaning dirt with a height exceeding the preset height, ensuring the continuous cleaning ability of the cleaning device.

Figure 7:
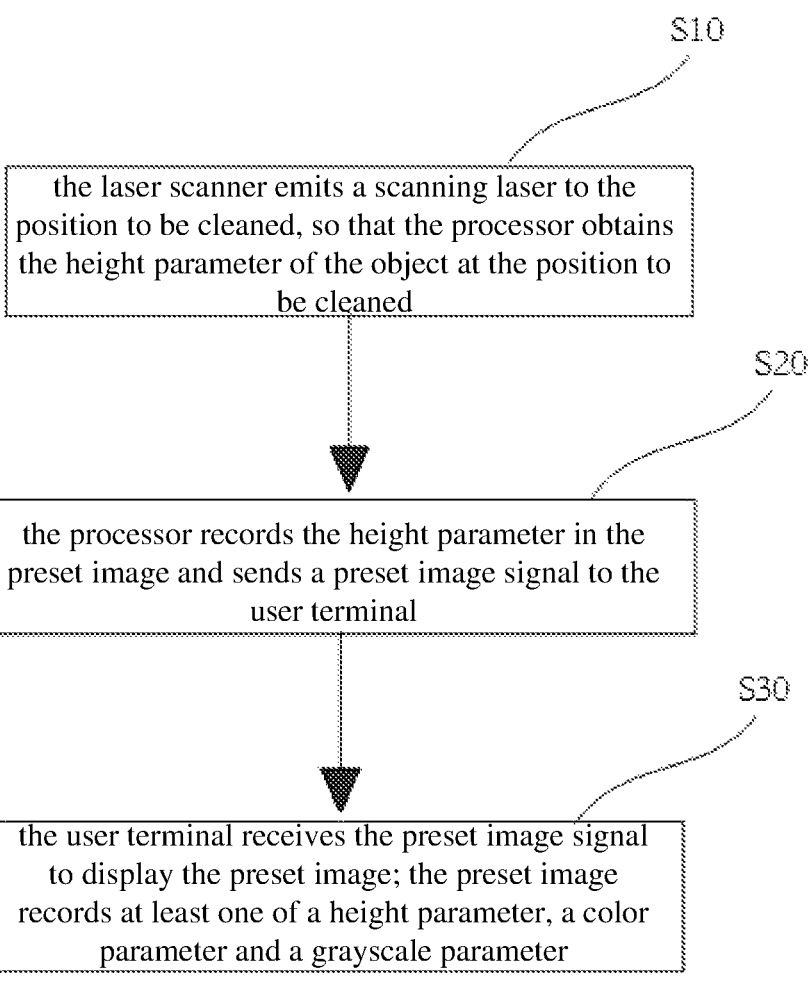
FIG. 7 is a flow chart of the control method for the cleaning device according to another embodiment of the present application.
Figure 8:
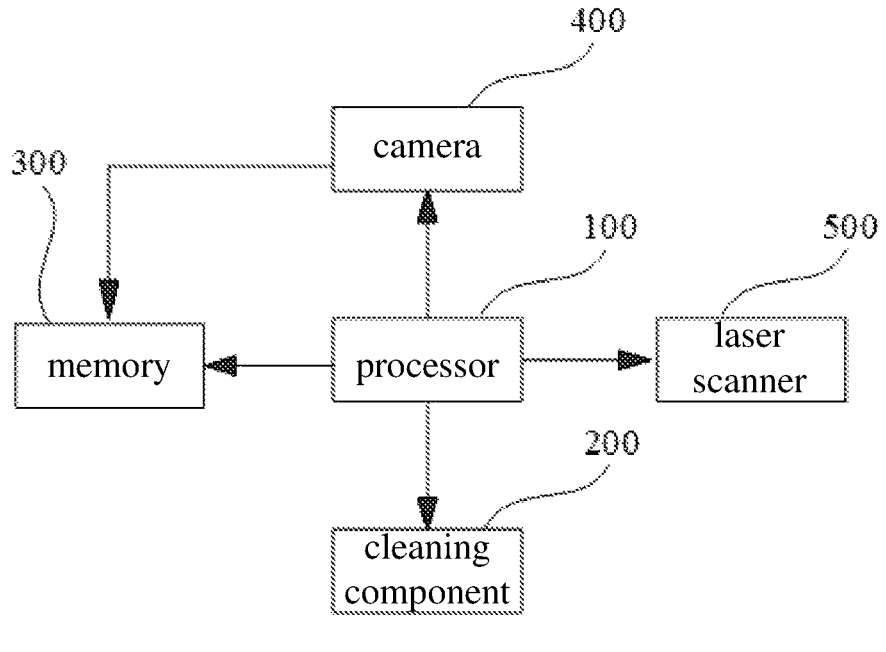
FIG. 8 is a control logic diagram of the cleaning device according to the present application.

In an embodiment, please referring to FIG. 7, the control method for the cleaning device further includes the step of displaying, via the cleaning device, a preset image on the user terminal, where the preset image is the first image or the contrast image.

The step of displaying, via the cleaning device, the preset image on the user terminal includes:

S10, the laser scanner emits a scanning laser to the position to be cleaned, so that the processor obtains the height parameter of the object at the position to be cleaned;

S20, the processor records the height parameter in the preset image and sends a preset image signal to the user terminal; and S30, the user terminal receives the preset image signal to display the preset image; the preset image records at least one of a height parameter, a color parameter and a grayscale parameter.

It should be noted that the user terminal can be an application (APP) on a mobile phone, tablet or computer, or can be a display dedicated to the cleaning device. In this way, the preset image obtained by the cleaning device can be displayed on the user terminal, allowing the user to intuitively understand the current environmental conditions at the position to be cleaned, providing users with a more intuitive experience. Specifically, in this embodiment, the user terminal can display at least one of the first image and the contrast image. When the user terminal displays the contrast image, the user can understand the clean status of the current position to be cleaned through the user terminal. When the user terminal displays the first image, the user can understand the dirt status of the current position to be cleaned through the user terminal.

Please referring to FIG. 1 to FIG. 8, it can be seen that the control method described in this embodiment is applied to cleaning devices. The present application also proposes a cleaning device. The cleaning device includes a cleaning component 200, a processor 100, a memory 300 and at least one camera 400. By capturing with the camera 400, the captured image can be obtained. The processor 100 analyzes the captured image. The memory 300 stores the image captured by the camera 400 and the image organized by the processor 100. The image stored in the memory 300 can be called by the processor 100, and after receiving instructions from the processor 100, the cleaning component 200 cleans the position to be cleaned. It can be understood that the functions of each program module of the cleaning device in this embodiment can be embodied according to the method in the embodiment of the above control method, and the specific implementation process can refer to the relevant description of the above control method, which will not be described again here. In this embodiment, the cleaning device is configured as a floor cleaning robot, a sweeping robot, a carpet cleaning robot, etc. When the cleaning device is configured as a carpet cleaning robot, the cleaning device has the ability to flush and clean the carpet.

The present application also proposes a computer-readable storage medium. The above-mentioned computer program product includes a non-transient computer-readable program medium on which a computer program is stored. The above-mentioned computer program is operable to cause the computer to execute some or all of the steps of any method described in the above-mentioned control method. That is, the specific implementation of the computer-readable storage medium of the present application is basically the same as the embodiments of the node positioning method described above, and will not be repeated here.

As a computer-readable storage medium, any combination of one or more computer-readable media can be used. The computer-readable storage medium can be a computer-readable signal medium or a computer-readable storage medium. The computer-readable storage medium can be, for example, but is not limited to, an electrical, magnetic, optical, electromagnetic, infrared or semiconductor system, apparatus or device, or any combination thereof. More specific examples (non-exhaustive list) of computer-readable storage media include: electrical connection with one or more wires, portable computer disks, hard disks, random access memory 300 (RAM), read only memory 300 (ROM), erasable programmable read-only memory 300 (EPROM or flash memory), optical fiber, portable compact disk read-only memory 300 (CDROM), optical memory 300, magnetic memory 300, or any suitable combination of the above. As used herein, a computer-readable storage medium can be any tangible medium that contains or stores a program, which can be used by or in connection with an instruction execution system, apparatus, or device.

Program code contained on the computer-readable storage medium can be transmitted using any appropriate medium, including but not limited to wireless, wire, optical cable, RF, etc., or any suitable combination of the above.

In the above description, the suffixes such as "module", "component" or "unit" used to represent elements are only used to facilitate the description of the present application and have no specific meaning in themselves. Therefore, "module", "component" or "unit" can be used interchangeably.

It should be noted that, in this article, the terms "comprise", "include" or any other variations thereof are intended to cover a non-exclusive inclusion, such that a process, method, article or device that includes a series of elements not only includes those elements, but also includes other elements not expressly listed or inherent to the process, method, article or device. Without further limitation, an element defined by the statement "includes a . . . " does not exclude the presence of additional identical elements in the process, method, article or device that includes that element.

Through the above description of the embodiments, those skilled in the art can clearly understand that the methods of the above embodiments can be implemented by means of software plus the necessary general hardware platform, of course, by hardware, but in many cases the former is better implementation.

The above are only some embodiments of the present application, and are not intended to limit the scope of the present application. Any equivalent structures or equivalent process transformations made using the contents of the description and the accompanying drawings of the present application, or direct or indirect applications in other related technical fields, are all included in the scope of the present application.

What is claimed is:

1. A control method for a cleaning device, comprising:
obtaining, via a processor, a contrast image of a position to be cleaned and storing the contrast image in a memory;
capturing, via a camera, an image of the position to be cleaned, as a first image;
comparing, via the processor, the first image with the contrast image to obtain a dirt mark; and
controlling, via the processor, a cleaning component to clean dirt at the dirt mark;
wherein before or at the same time as the capturing, via the camera, the image of the position to be cleaned as the first image, the method further comprises:
emitting, via a laser scanner, a scanning laser to the position to be cleaned, so that the processor obtains three-dimensional information of an object at the position to be cleaned as a height parameter; and
recording, via the processor, the height parameter in the first image so that an image feature corresponding to the first image has the height parameter.

2. The control method for the cleaning device of claim 1, wherein the obtaining, via the processor, the contrast image of the position to be cleaned and storing the contrast image in the memory comprises:
capturing, via the camera, an image of the position to be cleaned after being cleaned, as a second image;
comparing, via the processor, multiple second images obtained within a period of time, retaining image features common to the multiple second images, and obtaining the contrast image; and
storing, via the memory, the contrast image.

3. The control method for the cleaning device of claim 1, wherein the obtaining, via the processor, the contrast image of the position to be cleaned and storing the contrast image in the memory comprises:
capturing, via the camera, an image of the position to be cleaned that has been thoroughly cleaned, as a third image; and
configuring, via the processor, the third image as the contrast image and storing the contrast image in the memory.

4. The control method for the cleaning device of claim 3, wherein the capturing, via the camera, the image of the position to be cleaned that has been thoroughly cleaned, as the third image comprises:
capturing, via the camera, an image of the position to be cleaned after being cleaned, as a fourth image; and
comparing, via the processor, the fourth images obtained from two adjacent times according to time sequence, and configuring the fourth image with fewer image features as the third image.

5. The control method for the cleaning device of claim 1, further comprising:

obtaining, via the cleaning device, a preset image, wherein the preset image is the first image or the contrast image;

wherein the obtaining, via the cleaning device, the preset image comprises:

moving the cleaning device along a predetermined route;

capturing, via the camera, multiple images at different positions on the predetermined route according to a preset interval, as a fifth image; and sorting, via the processor, the multiple fifth images to obtain the preset image.

6. The control method for the cleaning device of claim 5, wherein the sorting, via the processor, the multiple fifth images to obtain the preset image comprises:

identifying, via the processor, a same part of two adjacent fifth images, as a positioning identifier;

adjusting, via the processor, a relative position of the positioning identifiers of two adjacent fifth images, to allow the same part of the two adjacent fifth images to overlap; and removing, via the processor, one of the same part in the two adjacent fifth images, to obtain the preset image.

7. The control method for the cleaning device of claim 1, wherein after controlling, via the processor, the cleaning component to clean dirt at the dirt mark, the method further comprises:

capturing, via the camera, an image of the position to be cleaned after being cleaned by the cleaning component, as a sixth image;

comparing, via the processor, the sixth image with the first image to determine whether the dirt mark changes;

in response to that the dirt mark changes, repeatedly cleaning, via the cleaning component, the dirt at the dirt mark until the dirt is removed; and in response to that the dirt mark does not change, determining, via the processor, that the dirt at the dirt mark cannot be cleaned, and updating the contrast image according to the dirt mark.

8. The control method for the cleaning device of claim 1, wherein before the controlling, via the processor, the cleaning component to clean dirt at the dirt mark, the method further comprises:

determining, via the processor, whether a height of the dirt at the dirt mark is within a preset height according to the height parameter;

in response to that the height of the dirt at the dirt mark is within the preset height, controlling, via the processor, the cleaning component to clean the dirt at the dirt mark; and in response to that the height of the dirt at the dirt mark is not within the preset height, determining, via the processor, that the dirt at the dirt mark cannot be cleaned, and updating the contrast image according to the dirt mark.

9. The control method for the cleaning device of claim 1, further comprising:

displaying, via the cleaning device, a preset image to a user terminal, wherein the preset image is the first image or the contrast image;

wherein the displaying, via the cleaning device, the preset image to the user terminal comprises:

emitting, via a laser scanner, a scanning laser to the position to be cleaned, so that the processor obtains a height parameter of an object at the position to be cleaned;

recording, via the processor, the height parameter in the preset image and sending a preset image signal to the user terminal; and receiving, via the user terminal, the preset image signal to display the preset image; wherein the preset image is configured to record at least one of the height parameter, a color parameter and a grayscale parameter.

10. A cleaning device, comprising a cleaning component, a processor, a memory and at least one camera, wherein a control program executable on the processor is stored in the memory, and the steps of the control method of claim 1 are implemented when the control program is executed by the processor.

11. A non-transitory computer-readable storage medium, wherein a control program is stored on the non-transitory computer-readable storage medium, and the steps of the control method of claim 1 are implemented when the control program is executed by a processor.

* * * * *